United States Patent [19]

Kasahara et al.

[11] 3,940,883

[45] Mar. 2, 1976

[54] PROCESS FOR THE GROWTH AND PRODUCTION OF MUSHROOM TISSUE

[75] Inventors: Nobuo Kasahara, Nagoya; Asao Shiota, Kasugai; Isamu Kitaguchi, Nagoya, all of Japan

[73] Assignee: Sanwa Kagaku Kenkyusho Co., Ltd., Nagoya, Japan

[22] Filed: Dec. 28, 1973

[21] Appl. No.: 429,122

[52] U.S. Cl............................................. 47/1.1; 71/5
[51] Int. Cl.²........................................... A01G 1/04
[58] Field of Search................................ 47/1.1; 71/5

[56] References Cited
UNITED STATES PATENTS

| | | | |
|---|---|---|---|
| 1,832,593 | 11/1931 | Szucs | 47/1.1 |
| 2,300,983 | 11/1942 | Sleighter | 47/1.1 X |
| 2,761,246 | 9/1956 | Szuecs | 47/1.1 |
| 2,928,210 | 3/1960 | Cirillo et al. | 47/1.1 |
| 3,286,399 | 11/1966 | Laniece | 47/1.1 |

FOREIGN PATENTS OR APPLICATIONS
37,047    11/1970    Japan

*Primary Examiner*—Robert E. Bagwill
*Attorney, Agent, or Firm*—Hammond & Littell

[57] ABSTRACT

A process for the growth and production of mushroom tissue which comprises the steps of suspending mushroom tissue in an aqueous nutrient fermentation medium solution, inoculating said solution into a mushroom growth and production bed comprising saw dust, wheat bran, rice bran, peptide for synthetic Japanese sake or liquor, acid potassium phosphate and/or chaff, and contained in a container, adjusting the pH of said bed to pH of 6.0–5.0 with an acid, ageing said mushroom growth and production bed under fermentation conditions, cooling the bed, turning the container upside-down and subjecting said bed to mushroom growth and production conditions.

12 Claims, No Drawings

PROCESS FOR THE GROWTH AND PRODUCTION OF MUSHROOM TISSUE

BACKGROUND OF THE INVENTION

This invention relates to an improved process for the growth and production of mushroom tissue by the utilization of an artificial mushroom growth and production bed and more particularly, to an improved process for the growth and production of mushroom tissue by the utilization of an artificial mushroom growth and production bed which essentially comprises providing mushroom tissue, suspending the mushroom tissue in an aqueous nutrient fermentation solution, inoculation of the mushroom tissue suspending nutrient fermentation solution into an artificial growth and production bed, ageing the nutrient fermentation inoculated bed and growing the mushroom tissue within the bed under growth conditions.

Edible mushrooms have been highly esteemed as a high class foodstuff because of their refined flavor, but at present the mushrooms are drawing one's attention on account of their nutritive qualities with demand for the foodstuff increasing year by year. Up to date, mushroom tissues have been cultivated and produced by placing the mushroom tissues into suitably cut holes in growth and production tree trunks, stems, stocks or branches cut from a tree selected from the group comprising *Quercus glandulifera*, *Quercus serrata* and chestnut trees, covering the holes with covers and suitably arranging and leaving such growth and production tree cuts in a forest or wood until the mushroom tissues will be fully grown. However, such a conventional growth and production process for mushrooms suffer from the disadvantages that areas where the process can be carried out are not readily available, that the process requires a great deal of labor and time and a relatively large space and that the time for harvest for mushrooms is limited to only two seasons of a year. Of the above-mentioned disadvantages inherent in the conventional mushroom growth and production process, the disadvantages in connection with area and space are most serious because the prior art process for growing and producing mushrooms has to be carried out at a mountainous area where trees suitably used for the process are available and the process requires a spacious land area. In order to eliminate such disadvantages inherent in the prior art growth and production process of mushrooms, of late a variety of improved processes for the growth and production of mushrooms which employs the so-called artificial mushroom growth and production bed instead of the conventional tree medium have been proposed and actually employed.

All of such processes for the growth and production of mushrooms employing the artificial growth and production bed have the disadvantages that they require a great deal of labor and a substantially long period of time for the growth and production of mushrooms though they are free of the disadvantages relating to area and space limitations.

SUMMARY OF THE INVENTION

Therefore, one object of the present invention is to provide a novel and improved process for the growth and production of mushroom tissue which can be effectively eliminate the disadvantages inherent in the prior art process for the growth and production of mushroom tissue.

Another object of the present invention is to provide a novel and improved process for the growth and production of mushroom tissue employing an artificial growth and production bed which makes it easier to grow and produce mushroom tissue and shortens the time required for the growth and production of mushroom tissue.

A further object of the present invention is to provide a novel and improved process for the growth and production of mushroom tissue employing an artificial growth and production bed which can be readily applicable to a mass production operation of mushroom tissue.

PREFERRED EMBODIMENT OF THE INVENTION

To describe briefly, according to the present invention, there is provided a process for the growth and production of mushroom tissue which essentially comprises providing mushroom tissue, suspending the mushroom tissue into an aqueous mushroom nutrient fermentation solution, inoculating the mushroom tissue suspending nutrient fermentation solution into a prepared artificial growth and production bed contained in a container, ageing the solution inoculated bed under ageing conditions at a temperature of 25°C, in a humidity of 75-80 percent and the intensity of illumination of about 100 candela until the bed ages sufficiently, cooling the contents of the container at 5°C for 50 hours, turning the container upside-down and subjecting the contents of the container under growth and production conditions at a temperature range of 10°-15°C, in a humidity of 70-75 percent and the intensity of illumination of about 200 candela. The above-mentioned artificial mushroom tissue growth and production bed is prepared by mixing saw dust, wheat bran, rice bran, peptide for synthetic sake (synthetic Japanese rice liquor), acid potassium phosphate and chaff together and adjusting the mixture to pH 6.0-5.0 with a suitable acid such as citric acid.

The process of the present invention will be described in further detail by way of one preferred example in which the process is successfully carried out, but it is to be understood that the present invention is not limited to such an example because the process can be carried in other various ways.

First of all, a nutrient fermentation solution is prepared by mixing together potato extract (an extract solution obtained by extracting 200 g. of potato per 1000ml. of the nutrient fermentation solution in heated water), 0.1 percent by weight of peptide for synthetic Japanese sake or rice liquor "APT" (the trade name of an acid decomposition product of soybean protein by the Ajinomoto K.K.) based on the weight of the nutrient solution and 10 percent by weight of glucose based on the weight of the nutrient solution in a container, mushroom tissue is suspended in the mixture solution, the suspension is adjusted to pH 6.0 and the contents of the container are then shaked at 25°C for 168 hours to thereby complete the prenutrient fermentation of the mushroom tissue. In a separate operation, a growth and production bed is prepared by mixing together 6 l. of saw dust, 1 l. of wheat bran, 1/10000 l. of peptide APT for synthetic Japanese sake or rice liquor, 1/10000 l. of acid potassium phosphate ($KH_2PO_4$) and 8 l. of chaff, 6 l. of water is added to the mixture and the resultant mixture is adjusted to pH 6.0-5.0 with citric acid. The thus obtained growth and production bed is then placed into an open top heat-resistance container with about one-fifth of space leaving above the content (based on the capacity of the container), the open top of the container is covered with a cellophane film, for example and thereafter, the content of the container is sterlized at 120°C for 30 minutes to thereby complete the preparation of the growth and production bed.

Thereafter, the thus obtained growth and production bed in the container is inoculated with the afore-mentioned mushroom tissue suspending nutrient fermentation solution in the amount of 1/100 l., the container is placed in a growth and production room adjusted to the mushroom tissue growth and production conditions at a temperature of 25°C, in a humidity of 75–80 percent and the intensity of illumination of about 100 candela. The container is left in the room under the afore-mentioned conditions until the artificial growth and production bed ages sufficiently for growth and production of the mushroom tissue. The artificial growth and production initiates its ageing within 60–80 days after the inoculation of the nutrient fermentation solution and ages sufficiently for growth and production of the mushroom tissue within 90–100 days after the inoculation whereupon the bed sets in the mushroom growth stage. Thereafter, the contents in the container are cooled at 5°C for 48 hours to transit from the nutrient growth stage to the reproduction growth stage whereupon the container is turned upside-down to position the now bottom top and the now top bottom whereby the space of one-fifth of the capacity of the reversed container is again provided above the contents. The contents of the container are then again replaced in the growth and production room under the growth and production conditions of the temperature range of 10°–15°C, the humidity range of 70–75 percent and the intensity of illumination of about 200 candela. The container is left in the room for about 2 weeks whereupon the growth of mushroom tissue sets in. In two weeks after the initiation of the reproduction growth stage, a first yield is made possible. After the second yield, mushroom tissue is reproduced and grown with replenishment of only water. The growth and production bed continues to reproduce mushroom tissue for about 2 months without any replenishment of nutriment.

Various mushroom growth and production beds were prepared by modifying the constituent components in various ways and experimentally employed for the growth and production of mushroom tissue. The results of the experiments will be given in the following Table 1. From the results, it will be noted that the rice bran has an important influence on the reproduction of mushroom tissue and the wheat bran, peptide for synthetic Japanese sake or liquor (APT) and chaff accelerate the growth of mushroom tissue and shorten the ageing time of the bed. The saw dust serves as the support for the other constituents of the bed and also as the nutriment for mushroom tissue. Although the effect of the acid potassium phosphate cannot be positively determined, it is considered that the component or constituent may maintain the pH of the nutrient solution within 5–6 and stabilize the growth conditions.

The various mushroom tissue growth and production beds of different compositions having the afore-mentioned nutrient fermentation solution inoculated therein were employed under the same growth and production conditions. Each of the growth and production containers had the capacity of about 1 kg. and 13 containers of the same-type composition were employed, respectively. Each of the growth and production bed compositions comprised the constituent ratio relationship of 6 by volume of saw dust, 1 by volume of wheat bran, 1 by volume of rice bran, 1/1000 by volume of APT, 8 by volume of chaff and/or 1/1000 by volume of $KH_2PO_4$.

Table 1

| Bed composition | saw dust wheat bran rice bran APT chaff $KH_2PO_4$ | saw dust rice bran APT chaff $KH_2PO_4$ | saw dust wheat bran APT chaff $KH_2PO_4$ | saw dust rice bran wheat bran chaff $KH_2PO_4$ | saw dust rice bran APT chaff | saw dust wheat bran rice bran APT $KH_2PO_4$ |
|---|---|---|---|---|---|---|
| Growth conditions of mushroom tissue 10 days after inoculation | — | — | — | — | — | — |
| Number of days required for sufficient ageing of bed | 92 | 108 | 130 | 115 | 101 | 135 |
| Yield within 2 weeks after growth of mushroom tissue | 28 ea. 1.2 kg | 18 ea. 0.6 kg | 6 ea. 0.2 kg | 11 ea. 0.5 kg | 16 ea. 0.6 kg | 15 ea. 0.7 kg |
| Yield within 15 – 45 days after growth of mushroom tissue | 30 ea. 1.8 kg | 21 ea. 1.1 kg | 10 ea. 0.4 kg | 18 ea. 1.1 kg | 24 ea. 1.5 kg | 20 ea. 1.0 kg |
| Yield within 45 – 90 days after growth of mushroom tissue (500ml. water replenished) | 21 ea. 1.0 kg | 12 ea. 1.7 kg | 4 ea. 0.2 kg | 20 ea. 1.2 kg | 10 ea. 0.7 kg | 14 ea. 0.9 kg |
| Total | 79 ea. | 51 ea. | 20 ea. | 49 ea. | 50 ea. | 49 ea. |

Table 1-continued

| Bed composition | saw dust wheat bran rice bran APT chaff KH$_2$PO$_4$ | saw dust rice bran APT chaff KH$_2$PO$_4$ | saw dust wheat bran APT chaff KH$_2$PO$_4$ | saw dust rice bran wheat bran chaff KH$_2$PO$_4$ | saw dust rice bran APT chaff | saw dust wheat bran rice bran APT KH$_2$PO$_4$ |
|---|---|---|---|---|---|---|
| yield | 4.0 kg | 2.4 kg | 0.8 kg | 2.8 kg | 2.8 kg | 2.6 kg |

The relationship between the mass of the growth and production bed and the mushroom tissue yield is shown in the following Table 2 and from the table, it will be noted that where the bed mass is over 5 kg., there is no significan difference.

Relationship between bed mass and mushroom tissue yield
(mushroom yield per kg. of bed mass)

| Bed mass Yield | 10 kg. | 5 kg. | 1 kg. |
|---|---|---|---|
| Yield within 14 days after growth of mushroom tissue | 5 ea. 220 g. | 6 ea. 280 g. | 5 ea. 200 g. |
| Yield within 15 – 45 days after growth of mushroom tissue | 9 ea. 420 g. | 8 ea. 350 g. | 4 ea. 195 g. |
| Yield within 45 – 90 days after growth of mushroom tissue | 4 ea. 180 g. | 4 ea. 170 g. | 3 ea. 85 g. |
| Total | 18 ea. 920 g. | 18 ea. 800 g. | 12 ea. 480 g. |

Since many embodiments may be made of this invention and since many changes may be made in the embodiments described, the foregoing is to be interpreted as illustrative only and the invention is defined by the appended claims.

What is claimed is:

1. A process for the growth and production of mushroom tissue comprising the steps of providing mushroom tissue of wood rotting fungi, suspending said mushroom tissue in an aqueous nutrient fermentation solution, inoculating said mushroom tissue suspending solution into a prepared mushroom growth and production bed contained in a container under sterilized conditions, ageing said nutrient fermentation solution inoculated bed, cooling the contents of said container, turning said container upside down and subjecting the contents of said container to mushroom growth and production conditions.

2. The process for the growth and production of mushroom tissue of claim 1 wherein said mushroom growth and production bed comprises a mixture the pH of which is adjusted to pH 6.0-5.0 with an acid.

3. The process for the growth and production of mushroom of claim 2 wherein said acid is citric acid.

4. The process for the growth and production of mushroom tissue of claim 1 wherein said mushroom growth and production bed comprises a mixture consisting of saw dust, wheat bran, rice bran, peptide for synthetic Japanese rice liquor, acid potassium phosphate and chaff.

5. The process for the growth and production of mushroom tissue of claim 1 wherein said mushroom growth and production bed comprises a mixture consisting of saw dust, rice bran, peptide for synthetic Japanese rice liquor, acid potassium phosphate and chaff.

6. The process for the growth and production of mushroom tissue of claim 1 wherein said mushroom growth and production bed comprises a mixture consisting of saw dust, wheat bran, peptide for synthetic Japanese rice liquor, acid potassium phosphate and chaff.

7. The process for the growth and production of mushroom tissue of claim 1 wherein said mushroom tissue growth and production bed comprises a mixture consisting of saw dust, wheat bran, rice bran, acid potassium phosphate and chaff.

8. The process for the growth and production of mushroom tissue of claim 1 wherein said mushroom tissue comprises a mixture consisting of saw dust, wheat bran, rice bran, peptide for synthetic Japanese rice liquor and chaff.

9. The process for the growth and production of mushroom tissue of claim 1 wherein said mushroom tissue comprises a mixture consisting of saw dust, wheat bran, rice bran, peptide for synthetic Japanese rice liquor and acid potassium phosphate.

10. The process for the growth and production of mushroom tissue of claim 1 wherein said ageing is carried out under the conditions of a temperature of about 25°C, in a humidity range of 75-80 percent and an intensity of illumination of about 100 candela.

11. The process for the growth and production of mushroom of claim 1 wherein said cooling is carried out at 5°C.

12. The process for the growth and production of mushroom tissue of claim 1, wherein said mushroom tissue growth and production conditions comprise a temperature range of 10°-15°C, a humidity range of 70-75 percent and an intensity of illumination of about 200 candela.

* * * * *